United States Patent

[11] 3,590,843

| [72] | Inventor | Arthur Stivers Meyer<br>West Chester, Ohio |
|---|---|---|
| [21] | Appl. No. | 868,749 |
| [22] | Filed | Oct. 23, 1969 |
| [45] | Patented | July 6, 1971 |
| [73] | Assignee | General Electric Company |

[54] MULTIPLE-JET LIQUID LEVEL DETECTOR
6 Claims, 2 Drawing Figs.

[52] U.S. Cl. .................................................. 137/81.5,
137/393, 73/299
[51] Int. Cl. ..................................................... F15c 1/14,
G01f 23/14
[50] Field of Search ........................................... 137/81.5,
251, 393, 386; 116/118; 73/299

[56] References Cited
UNITED STATES PATENTS

| 1,549,196 | 8/1925 | Hall | 137/81.5 X |
| 3,269,404 | 8/1966 | Lebow | 137/393 X |
| 3,521,656 | 7/1970 | Sokel | 137/393 X |

Primary Examiner—William R. Cline
Attorneys—Thomas J. Bird, Jr., Lee H. Sacks, Derek P. Lawrence, Frank L. Neuhauser, Oscar B. Waddell and Joseph B. Forman ABSTRACT: The disclosure describes a fluid level detector in which two identical fluid jet devices, each comprising a fluid jet nozzle and a receiver, are placed in a fluid container. One such device is located below the nominal fluid level in the container and the other is located at the maximum desired fluid level therein. The degree of pressure recovery in each of the receivers depends upon the presence or absence of fluid at that device, and a differential pressure sensing means to sense differences in the recovered pressures is provided to indicate presence or absence of liquid at the upper device.

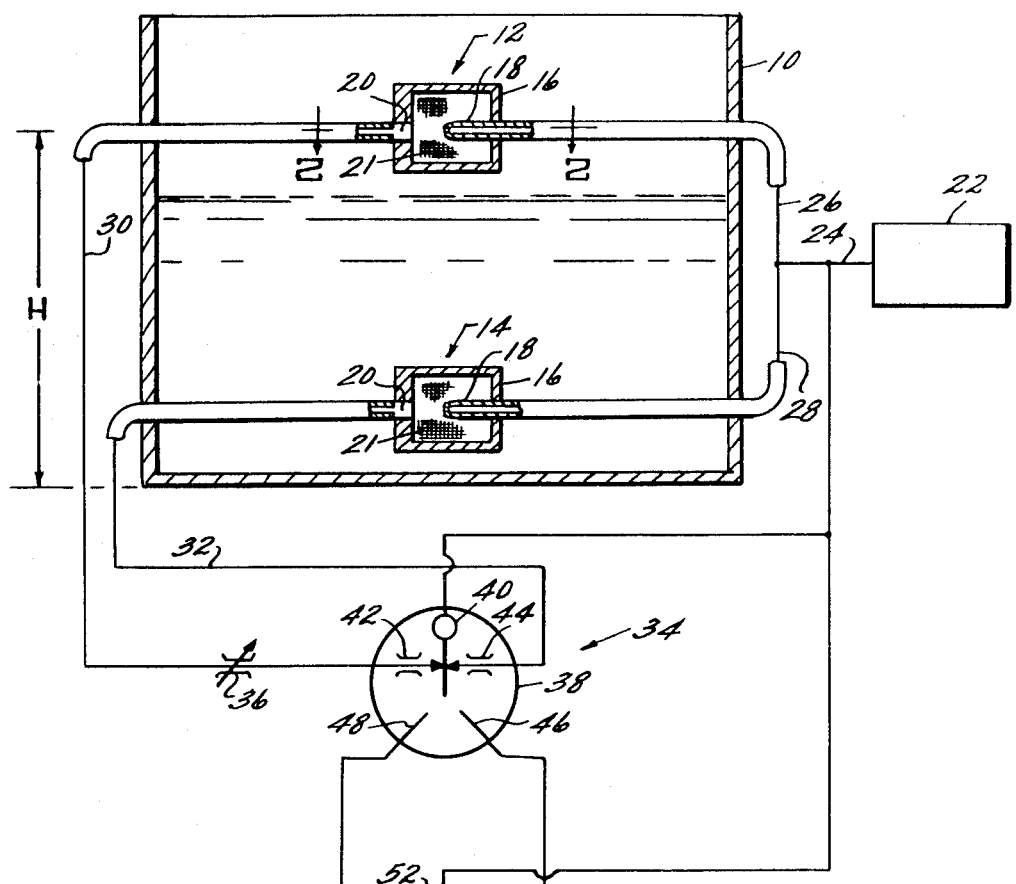
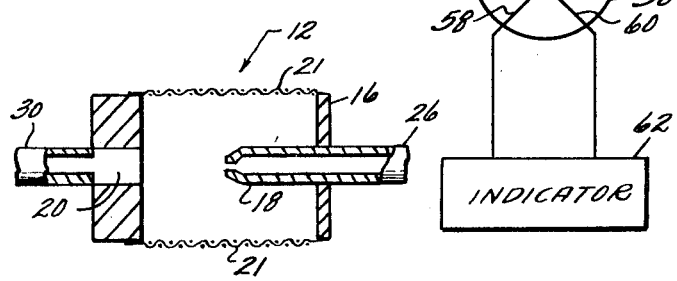
INVENTOR.
ARTHUR S. MEYER

MULTIPLE-JET LIQUID LEVEL DETECTOR

BACKGROUND OF THE INVENTION

This invention relates to fluid level detectors and more particularly to such detectors which have no moving parts and have inherent compensation for pressure and temperature effects on the output of the sensors.

In many applications, it is required that the level of fluid in a container be maintained above a minimum or below a maximum level. Several of these applications involve severe environmental factors which must also be taken into consideration in the design of the device. For example, the lubricant sumps surrounding the bearings of a gas turbine engine must be maintained below a maximum fluid level to avoid overheating of the fluid and hence overheating of the bearings which the fluid is designed to lubricate and cool. At the same time, any device designed to maintain the fluid level as described must be highly reliable, must be provided with a minimum weight penalty, and must be adaptable to and compensate for variations in temperature and pressure in the sump. Additionally, gas turbine engine sumps are generally pressurized with high-pressure air to preclude leakage of lubricating fluid into the hot parts of the engine, and the mixture of this air with the lubricating oil will create an air-oil foam whose level must be limited to avoid clogging and overheating of the sump and the bearings. In view of the presence of this air-oil foam which may have varying specific gravity, temperature, and other physical characteristics, it becomes obvious that gravitational or float type apparatus for measuring oil level would be unsatisfactory, as would other devices which depend upon consistency of the specific gravity of the oil or air-oil mixture in the sump. It is, therefore, desirable that a simple and reliable means be provided for detecting the presence above a predetermined level of oil, and air-oil foams in bearing sumps or other fluid containers.

BRIEF SUMMARY OF THE INVENTION

Briefly stated, the invention comprises a pair of identical fluid jet devices, one of which is mounted in a bearing sump or other fluid container below the minimum desired fluid level and the second of which is mounted in the same container at the maximum desired fluid level. Each fluid jet device comprises a fluid nozzle and a fluid receiver secured in spaced relation with the fluid nozzle and in alignment with the axis thereof. A source of pressurized fluid, i.e., normally the same fluid as is contained in the container, is pumped through the jet nozzle and captured by the spaced receiver, the percentage of pressure recovery depending upon viscous interaction of the jet fluid stream with substances in the space between the nozzle and the receiver. The pressure recoveries in the two receivers are compared in a differential pressure sensing device, any substantial difference therein indicating the presence of fluid at the higher of the two fluid jet devices.

BRIEF DESCRIPTION OF THE DRAWINGS

While the invention is particularly pointed out and distinctly claimed in the claims appearing at the end of this specification, it is believed that it will be better understood by reference to the discussion below and the accompanying drawings in which:

FIG. 1 is a partially sectioned, partially schematic view of the fluid level sensing invention; and FIG. 2 is a partially fragmented section view taken along the line 2-2 of FIG. 1.

DESCRIPTION OF THE PREFERRED EMBODIMENT

FIG. 1 illustrates a fluid container 10 in which a nominal fluid level H is maintained and which contains a pair of identical fluid jet devices 12 and 14. Device 14 is submersed below the nominal fluid level, and device 16 is maintained at a level which represents the maximum desirable level of fluid in container 10.

Referring to both FIGS. 1 and 2, devices 12, 14 comprise a generally rectangular structural frame 16 having an open center, a fluid nozzle 18 adapted to convert pressurized fluid into a high-velocity fluid stream, and a fluid receiver 20 mounted to frame 16 in spaced relation with the nozzle 18 and aligned with the axis thereof. Thus, it can be seen that when a fluid such as oil or an air-oil mixture is above the level of the particular device 12, 14 the oil or air-oil mixture, as the case may be, will be interposed between nozzle 18 and receiver 20.

When pressurized fluid is supplied to nozzle 18, a high-velocity jet stream will be generated and directed toward and into receiver 20 and will be recovered by receiver 20 in the form of pressure energy. The amount of energy recovered by receiver 20 will depend in part upon the velocity at which the high-velocity fluid stream reaches the receiver, which in turn will depend upon interaction between the fluid jet stream and the medium interposed between nozzle 18 and receiver 20. In the situation where the level of fluid in container 10 is below device 12, the pressure recovered in the receiver 20 of device 12 will have suffered very little detriment because of interaction between the fluid jet stream and the medium. However, when an air-oil mixture or oil itself is interposed between nozzle 18 and receiver 20 of device 12, the fluid jet stream issuing from the nozzle will be subjected to interaction with the oil or air-oil mixture and the interaction will cause a measurable pressure loss in the fluid jet stream, which loss will be reflected at receiver 20.

The absolute value of the pressure received at receivers 20 will, in addition to the nature of the medium interposed between nozzles 18 and receivers 20, depend upon the pressure level inside container 10, the temperature of the fluid in container 10, the pressure differential between the supply to nozzle 18 and the interior of container 10, and other environmental factors inside the container 10. Thus, it is obvious that a single fluid jet device 12 could not in itself provide a meaningful readout indicative of fluid level. It is for this reason that a second device 14 is provided which is identical to device 12, and which is supplied from a pressure source common to both devices 12 and 14. The second device 14 is subjected to the same environmental factors of pressure, temperature, and fluid composition that device 12 is subjected to. Hence, the difference in output between device 12 and device 14 will be reflective primarily of the presence or absence of oil or an air-oil mixture between the nozzle 18 and receiver 20 of device 12.

Inasmuch as devices 12, 14 are made to operate in an oil or other fluid, and inasmuch as the fluid in container 10 will not necessarily be in a static condition, the effects of circulation of the fluid in container 10 upon the pressure recovery in devices 12, 14 must be minimized. This is accomplished by providing a perforate screen 21 which may be in the form of a perforated plate or ordinary mesh screen over the open sides of frames 16. Screens 21 will allow fluid to enter the chamber defined thereby but will provide enough resistance to fluid flow into and out of that chamber to significantly attenuate circulation and other effects of the fluid contained in container 10 upon the pressure recovery effected at receivers 20.

It was stated above the the differential in pressure recovered by the two receivers 20 would be primarily indicative of the presence or absence of liquid at fluid jet device 12. Means 34 are, therefore, provided to measure this differential or indicate a threshold differential and are connected to receivers 20 by signal conduits 30, 32. Additionally, conduit 30 includes a variable restrictor 36 which can be used to provide an initial balance to the system to account for the nature of the fluid contained in container 10 and other factors unique to a particular system.

Differential pressure sensing means 34 comprises a proportional fluid amplifier 38, amplifier 38 being of well-known construction which is amply documented in the patent and other technical literature. Amplifier 38, which is illustrated schematically, includes a power nozzle 40 for converting high-pressure fluid to a high-velocity fluid jet, a pair of control ports 42, 44 oppositely disposed with respect to the axis of nozzle 40 and located adjacent thereto, and a pair of receivers 46, 48 adapted to receive in varying degrees fluid from the diverted jet stream issuing from nozzle 40 and to convert a portion of the velocity energy therein contained into pressure energy. The output of amplifier 38 as reflected by the pressure levels in receivers 46, 48 is connected to a digital fluid amplifier at its control ports 54, 56.

A digital amplifier is often commonly referred to as a wall attachment device or Coanda effect device and is characterized in that a threshold signal at one of its control ports will cause a hard over diversion of its power stream to one or the other of its output receivers.

Amplifier 50, shown schematically, is embodied in a well-known construction, examples of which are amply documented in the patent and technical literature, and includes as part of its basic elements a power nozzle 52, the control ports 54, 56 and a pair of receivers 58, 60. The output from digital amplifier 50 is directed to an indicator 62 which may, for example, comprise a fluid or hydraulic to electrical transducer and an alarm bell or light.

In operation, fluid is supplied to both devices 12, 14 and to the power nozzles 40, 52 of fluid amplifiers 38, 50 respectively from pressure source 22. That portion of the fluid flowing to devices 12, 14, through its interaction with the fluid in container 10 creates a pressure differential which is reflected between conduits 30, 32 and ultimately reflected at control ports 42, 44 of amplifier 38. At the same time, the high-pressure fluid supplied to the amplifiers puts them into operation and they each assume a state reflective of the presence or absence of fluid at the level of device 12 and the resistance value of variable resistor 36. The system is then calibrated by adjusting resistor 36 until the indication on indicator 62 reflects the state of affairs in container 10. For example, if the fluid level in container 10 is below that of device 12, resistor 36 is adjusted to create sufficient diversion of the fluid stream issuing from nozzle 40 to favor receiver 46, thus causing amplifier 50 to be switched so that the output of its power stream will be reflected in receiver 58 to cause a signal on indicator 62 which will assure that its alarm will not operate.

When the fluid level in container 10 reaches fluid jet device 12, the interaction between the jet stream issuing from nozzle 18 of device 12 will cause a decrement in the pressure recovered in receiver 20 thereof, thus creating a pressure differential between control ports 42 and 44 which will cause the jet stream issuing from nozzle 40 to favor receiver 48 of amplifier 38, which will in turn cause amplifier 50 to switch its output to receiver 60, thereby actuating indicator 62 and the alarm means associated therewith.

Having above described a preferred embodiment of the invention, although not exclusive of all possible equivalents, and having explained the use, operation, function and advantages thereof in achieving the objectives herein stated, what is desired to be secured by Letters Patent is specified in the claims below.

What I claim is:

1. In combination with a fluid container, a fluid level detector comprising:
    a pair of identical fluid jet devices which are mounted at different levels in said container, each said device comprising:
    an open structural frame,
    a fluid nozzle secured in one end of said frame, and
    a fluid receiver secured in the opposite end of said frame in axial alignment with said fluid nozzle and axially spaced therefrom;
    a source of pressurized fluid compatible with the fluid intended to be contained in said container;
    conduit means connecting said pressurized-fluid source with each said fluid nozzle;
    differential pressure indicating means having two input connections and an output means; and
    signal conduit means connecting said fluid receivers to different ones of said input connections;
    whereby the pressure differential which is detected by said indicating means will indicate the presence or absence of a predetermined fluid level in said container.

2. The combination recited in claim 1 wherein the open portions of each said structural frame are covered with perforate screening, thereby allowing container fluid to be interposed between said fluid nozzles and said fluid receivers while attenuating signal disturbance affects of container fluid in motion.

3. The combination recited in claim 1 wherein said differential pressure indicating means comprises:
    a fluid amplifier which comprises a power nozzle, a pair of control ports oppositely disposed with respect to the axis of said power nozzle and adapted to issue control fluid streams to interact with the power stream issuing from said power nozzle and divert it from its axis, and a pair of output receivers oppositely disposed with respect to the axis of said power nozzle, said input connections comprising said control ports;
    indicating means; and
    means connecting said output receivers with said indicating means.

4. The combination recited in claim 3 wherein one of said signal conduits includes a variable resistance flow restrictor.

5. The combination recited in claim 4 wherein said fluid amplifier is a proportional amplifier and wherein said means connecting said output receivers with said indicating means includes a digital fluid amplifier whose control ports are connected to the output receivers of said proportional amplifier.

6. The combination recited in claim 5 wherein one of said fluid jet devices is mounted in said container below the minimum desired fluid level therein and the other of said fluid jet devices is mounted in said container at the maximum desired fluid level.